Patented Oct. 11, 1949

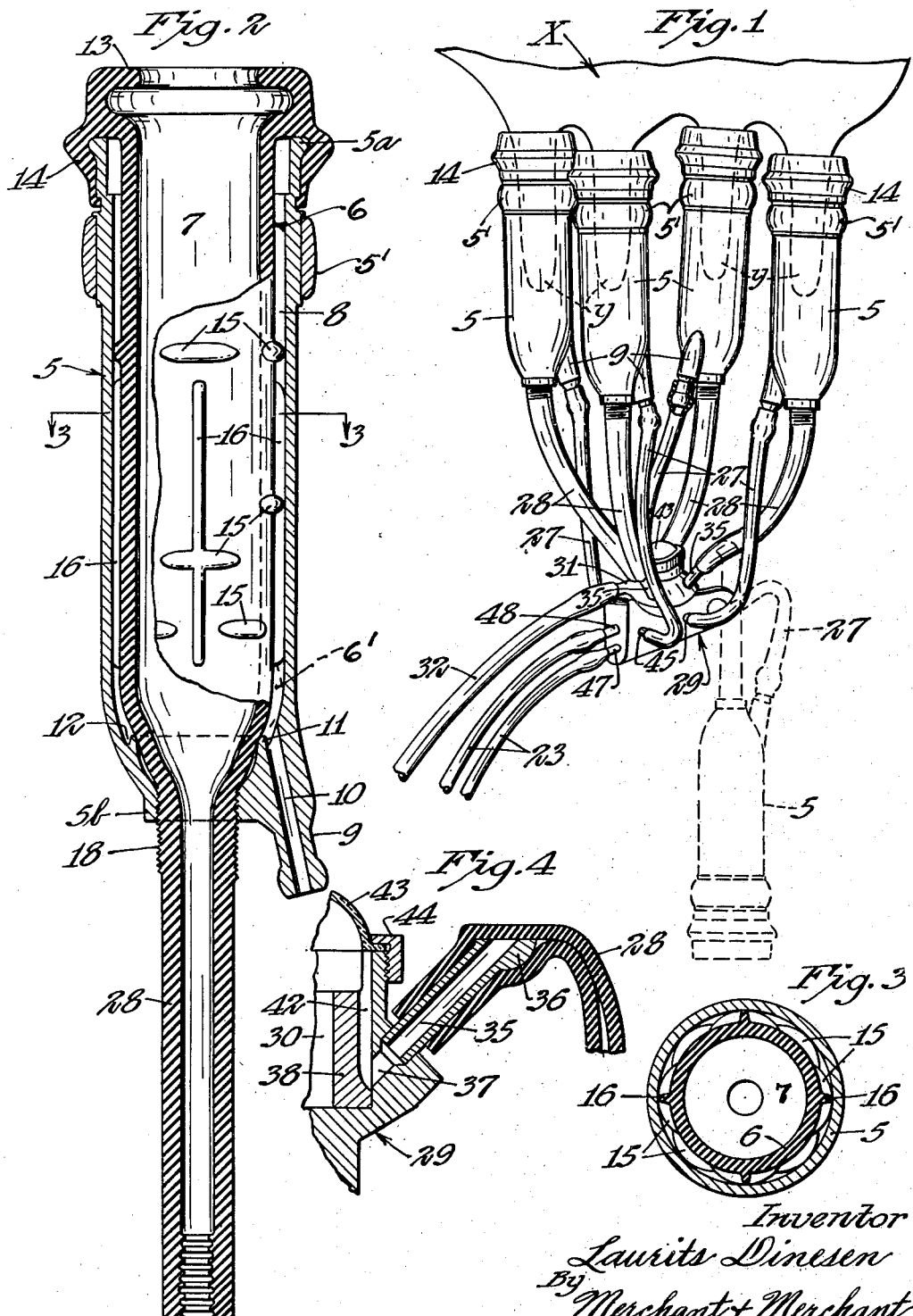

2,484,696

UNITED STATES PATENT OFFICE 2,484,696

TEAT CUP

Laurits Dinesen, Minneapolis, Minn.

Application February 7, 1944, Serial No. 521,297

1 Claim. (Cl. 31—85)

My present invention relates to improvements in teat cups for use in connection with milking machines, and more particularly to teat cups of the type generally designated as two-chambered teat cups. This type of teat cup comprises a rigid, tubular outer shell and an inflation in the nature of a flexible inner tubular shell; the latter providing an inner teat receiving chamber and being spaced from the former to provide therewith an annular outer chamber surrounding the teat receiving chamber. In milking machines employing this type of teat cup the inner teat receiving chambers are connected through milk tubes or lines to a suitable milk receptacle, and are subject to partial vacuum which tends to draw the milk from the teats and the outer chambers of the teat cups are alternately subject to partial vacuum and atmospheric pressure. The partial vacuum in the inner teat receiving chamber tends to withdraw milk from the teat and to collapse the inner shell or inflation about the teat, and produce a squeezing action on the teat, whereas the intermittent partial vacuum in the outer chamber intermittently neutralizes pressure on opposite sides of the flexible inner shell or inflation thereby producing an alternate contraction and expansion of the inner shell or inflation. The over-all result of this alternate expansion and contraction of the inflation is the producing of an intermittent squeezing of the teat in a manner closely simulating the action produced under hand milking.

Teat cups of the general character referred to above are disclosed in my prior patents, 1,690,327 and 2,329,396. In these prior art teat cups the rigid outer shells were spun or stamped from metal, whereas the present invention relates particularly to teat cups of this general character wherein the rigid outer shells are formed by molding, and preferably by molding of plastic material, such as "Tenite" or "Bakelite."

The forming of these rigid outer shells of molded plastic material results in important production savings but does, nevertheless, introduce or aggravate certain problems, the solutions to which are the subject matter of the present invention. These and other important objects and advantages of the invention will be made apparent from the following specification, claim and appended drawings.

Referring to the drawings:

Fig. 1 is a view in side elevation, with some parts broken away and some parts shown in section, of a plurality of teat cups of the invention in operative position with respect to a cow's udder and teats;

Fig. 2 is an enlarged view in axial section through one of the improved teat cups;

Fig. 3 is a transverse sectional view taken on line 3—3 of Fig. 2; and

Fig. 4 is an enlarged fragmentary detailed sectional view showing, in full lines, how the milk passage through a milk tube of any one of the teat cups is automatically closed off when that teat cup comes free of the teat and is permitted to hang on the milk tube under the action of gravity, as shown by dotted lines in Fig. 1.

The rigid outer shell of a preferred embodiment of the present invention is indicated as an entirety by 5, the flexible and collapsable inner shell or inflation is indicated in its entirety by 6, the inner teat receiving chamber by 7, and the outer annular chamber formed between the inner and outer shells is indicated by 8. The outer shell may be assumed to have been formed by molding of suitable plastic material such as "Tenite" or "Bakelite." This rigid outer shell is open at both ends. At its upper end the said outer shell is formed with an annular outstanding sealing flange or shoulder 5ᵃ. The lower end portion of the rigid outer shell is downwardly contracted between its lower end to provide a reduced diameter discharge neck 5ᵇ.

At its lower end portion the rigid outer shell is also integrally formed to provide a downwardly and outwardly diverging air tube coupling nipple 9, the axial passage 10 of which, nipple, opens through the converging lower portion of the outer shell 5 and into the converging portion of the annular outer chamber 8.

At this point attention is directed particularly to my prior Patent 1,690,327, wherein it will be seen that the air passage through the outer shell to the outer annular chamber, and which is indicated by 12 in said prior patent, is located near the top of the annular outer chamber, and the connection thereto is made through a tube 11 extending longitudinally along the outer wall of the outer shell and terminating in a nipple-like end positioned to closely correspond to that of the nipple 9 of the present invention. The high location of the air passage to the outer annular chamber of my said prior patent was chosen because of the reduced tendency of the elastic inner shell or inflation to expand into contact with the outer shell at this point and close the passage to the inner chamber. However, the molding or casting operation involved in making the outer shells of the present invention had made the high location of the air passage to the outer chamber impractical from the manufacturing point of view. Hence, before a commercially practical teat cup involving a molded plastic outer shell could be produced it was necessary to provide a construction whereby accidental closing off of the air passage to the outer annular chamber by expansion of the inflation thereover would be eliminated. The solution to this particular problem forms an important object of the invention and comprises an annular flange 11 formed integrally with the rigid outer shell 5. This annular flange or shoulder 11 has its base immediately adjacent the point of entry into the outer chamber of the air passage 10, projects into said outer chamber 8, and preferably projects partially over the inner extremity of the passage 10. In other words, in the preferred construction the passage 10 opens through the wall of the shell 5 into an upwardly opening annular channel 12 radially outwardly of the flange 11. The function of this flange 11 in preventing accidental closing of the passage 10 will be elaborated on after a more complete description of the flexible inner tube or inflation.

The inner tubular shell or inflation 6 is provided at its open upper end with an inwardly projecting annular teat engaging sealing flange 13 below which the said inflation is formed with an elastic down-turned sealing flange 14 that is stretched over the flanged upper end 5ª of the outer shell and seals the upper end of chamber 8 from the atmosphere. Intermediate its ends the inflation 6 is formed on its outer surface with spaced outstanding lugs 15 and spaced outstanding ribs 16. These lugs 15 and ribs 16 project into the outer chamber 8 and are adapted to come into engagement with the outer shell 5 in an attempt to maintain spacing between the inner and outer shells under pulsating air pressure conditions, and must be so spaced as to provide a continual air passage or passages from top to bottom of the chamber 8. The lower end portion of the collapsible shell or inflation is contracted to more or less correspond to the contraction of the inner surface of the outer shell, and said inner tube or inflation 6 is integrally formed at its reduced diameter lower end with a depending flexible milk tube 28. This depending milk tube 28 extends downwardly through the reduced diameter discharge neck 5ᵇ of the outer shell and is provided at its upper portion adjacent the main body of the inflation with a series of circular ribs 18 that engage the inner surface of the neck 5ᵇ with expanding action to thereby secure the lower end of the annular chamber 8 from atmosphere. In Fig. 2 the entire milk tube 28 is shown as being pulled through the neck 5ᵇ to the maximum extent, but in practice it will be understood that more or less of the ribbed portion 18 of the tube may be pulled through or into the neck 5ᵇ, depending in part upon the condition of the inflation itself, which will become stretched to a greater or less extent in use.

In Fig. 1 the cow's udder is indicated by x and the four teats thereof by y and the complement of four teat cups is shown as being applied as for a milking operation. The milking mechanism to which the improved teat cups of the present invention are connected may take various different forms but it may be assumed for the purpose of the present example that such milking mechanism is of the variety disclosed in my prior Patent 2,329,396, and therefore the milk tubes from the inner teat cups and other parts of the present disclosure lying below the outer shells of the teat cups are or will be identified by numerals corresponding to the numerals assigned to like parts in my said prior Patent 2,329,396. By reference to the drawings hereof, or for that matter to the drawings of my last identified prior patent, it will be seen that the depending milk tubes 28, which are in the nature of extensions of their respective inflations, extend to a coupler head 29; each of said milk tubes 28 being telescoped over the head 36 of a different coupling nipple 35. The several nipples 35 all connect within the coupler head to a common collecting chamber 30 through ports 37 and grooves or flow restricting channels 42. The collecting chamber 30 of the coupler head 29 may be assumed to be connected to a milk receptacle or pail, not shown, but which may be of the type indicated at 10 in my last said prior patent, by a nipple 31 and a common milk tube 32. It may be further assumed that the milk tube 32 is subject to partial vacuum as in the case of my said prior patent, whereby to maintain the inner chambers of the teat cups and the teats y thereof under partial vacuum or suction, which will tend to withdraw milk from the teats and deliver the same to the milk receptacle, and will tend to collapse the flexible inflations. The outer annular chambers 8 of the several teat cups are each connected to a different coupler head nipple 45 through the medium of an independent flexible air tube or hose 27. The air tubes or hoses 27 are telescopically applied over the nipples 45 and 9 and connect to the outer teat cup chambers through the passages 10 of the nipples 9. The nipples 45 of the coupler head, of which there are four, may be assumed to be connected through internal passages of the coupler head 29, not shown, two thereof to a nipple 48 and two thereof to a nipple 47. These nipples 47 and 48 are connected each to a different air line or hose 23, which air lines or hoses may be assumed to be connected, as in my last said prior patent or otherwise, alternately to vacuum and atmospheric pressure through automatic valve mechanism such as the usual pulsator, not shown, whereby to intermittently neutralize the collapsing tendency of the inflations on the teats and produce on the teats an intermittent squeezing action simulating hand milking.

Under the above described expanding and contracting action of the inflations or inner shells 6 there will obviously be a tendency for the inflations to expand over and close off the air passages 10, and this in spite of the fact that the original size and shape of the inflations and the lugs 15 and ribs 16 thereof tend to prevent this extreme expansion. However, it will be understood that when the passages 10 open into the outer chambers of the teat cups close to the bottom thereof, as in the present case, the tendency of the inflations to close off the passages 10 increases as the integrally formed milk tubes 28 of the inflations are pulled further through the necks 5ᵇ to compensate for stretching of the inflations or otherwise. Furthermore, when these flexible, collapsable inflations, which are usually of rubber or synthetic rubber, are subject to prolonged use they are apt to develop weak spots which will bulge and contact the walls of the rigid outer shells. If such a bulge occurs at a point spaced from the air passage or port 9 little or no difficulty is apt to be encountered, but if such a bulge should occur directly opposite the point of entry of the passage 10 to the outer annular chamber a complete blocking off of this passage can be expected to occur in the absence of some very effective means for preventing such accidental closing off of the passage 10 when such a bulge occurs over the same. In accordance with the present invention the flange 11 is provided for this purpose and has been found wholly effective.

In the preferred construction illustrated, particularly in Fig. 1, it will be seen that the air passage 10 opens into the channel 12 formed by the protecting flange 11, and which channel is completely circular and upwardly opens into the annular outer chamber 8 of the teat cup. With this construction if a bulge, such as indicated by dotted lines 6' in Fig. 2, should occur directly over the inner end of port or passage 10 the flange 11 will prevent a complete blocking off of the said passage. According to the illustration in Fig. 2 a bulge, such as indicated by 6', may cut off direct upward communication between the passage or port 10 and the outer chamber 8 without producing any serious results, since the passage 10 is in communication with the channel 12 back of flange 11, and since this channel 12 will be, even under these conditions, in upwardly opening communication with the annular chamber 8 throughout most of this circumference.

Another important feature of the invention will now be described. Occasionally a teat cup will come loose on the teat and fall during the milking operation, and when this happens it is desirable that the milk tube 28 of that teat cup be closed off from atmosphere so that partial vacuum will be maintained on the other teats, and to prevent the possible sucking into the inoperative teat cup of foreign matter. As in my prior Patent 2,329,396 this is accomplished automatically by diagonally cutting the head ends of the nipples 35 over which the lower ends of the inner milk tubes 28 are telescoped. The object of this arrangement is that when a teat cup falls under the action of gravity to the position shown by dotted lines in Fig. 1 the rubber milk tube 28 will be drawn over the open upper end of the nipple 35 and automatically close the same, as shown in Fig. 4. Hitherto the objection to this otherwise desirable feature was the necessity of using relatively heavy teat cups to produce the automatic closing off action and which, due to their excessive weight, increased the tendency of the teat cups to come free of the teats and drop. In accordance with the present invention, the outer shells 5 are primarily made very light and are then weighted near their extreme upper ends by application of metallic bands 5'. In practice, the metallic bands 5' are preferably somewhat heavier than the outer shells 5 to which they are applied, this at least when the outer shells are formed of very light plastic material. However, because the major weight of a teat cup is adjacent its extreme upper or outer end, the desired automatic closing action exemplified in Fig. 4 can be brought about with an over-all teat cup weight less than was required in prior art structures wherein the major weight of a teat cup was involved in a relatively very heavy metallic outer shell and was fairly well distributed from one end to the other.

I claim:

A teat cup for milking machines comprising a rigid tubular outer shell and an inflation in the nature of an elastic teat-receiving inner tubular shell, said inflation being open at its upper end to receive a teat and being formed at its lower end to provide an elastic integral milk tube extending through and beyond the outer shell, the inflation and rigid outer shell being connected at their opposite end portions to form air tight joints and being spaced apart intermediate said end joints to afford an annular air chamber therebetween, said outer shell being provided adjacent its lower end with an integral upwardly and inwardly directed flange forming an annular channel that opens upwardly into the said annular outer chamber, and said outer shell being provided with an air port opening therethrough into said upwardly opening annular channel, whereby to maintain communication between said port and said annular outer chamber under conditions of undue expansion of the inflation toward said port.

LAURITS DINESEN.

REFERENCES CITED

The following references are of record in the file of this patent:

UNITED STATES PATENTS

| Number | Name | Date |
| --- | --- | --- |
| 950,145 | Shafer | Feb. 22, 1910 |
| 1,239,923 | Leitch | Sept. 11, 1917 |
| 1,312,941 | Anderson | Aug. 12, 1919 |
| 1,538,731 | Oden | May 19, 1925 |
| 2,099,884 | Green | Nov. 23, 1937 |
| 2,302,443 | Hodsdon | Nov. 17, 1942 |